United States Patent

Jiang et al.

(10) Patent No.: US 9,459,696 B2
(45) Date of Patent: Oct. 4, 2016

(54) GESTURE-SENSITIVE DISPLAY

(71) Applicant: MOTOROLA MOBILITY LLC, Libertyville, IL (US)

(72) Inventors: Jun Jiang, Lake Zurich, IL (US); Rachid M. Alameh, Crystal Lake, IL (US); Sen Yang, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 57 days.

(21) Appl. No.: 14/019,703

(22) Filed: Sep. 6, 2013

(65) Prior Publication Data

US 2015/0009120 A1 Jan. 8, 2015

Related U.S. Application Data (60) Provisional application No. 61/843,620, filed on Jul. 8, 2013.

(51) Int. Cl.
| | |
|---|---|
| *G06F 3/01* | (2006.01) |
| *G09G 3/34* | (2006.01) |
| *G09G 3/36* | (2006.01) |
| *G06F 3/042* | (2006.01) |

(52) U.S. Cl.
CPC ............ *G06F 3/017* (2013.01); *G06F 3/0421* (2013.01); *G09G 3/3406* (2013.01); *G09G 3/3622* (2013.01)

(58) Field of Classification Search
None
See application file for complete search history.

(56) References Cited

U.S. PATENT DOCUMENTS

| | | | |
|---|---|---|---|
| 7,184,009 B2 | 2/2007 | Bergquist | |
| 7,904,189 B2 | 3/2011 | Basson et al. | |
| 8,175,728 B2 | 5/2012 | Weinberg et al. | |
| 8,269,175 B2 | 9/2012 | Alameh et al. | |
| 8,294,105 B2 | 10/2012 | Alameh et al. | |
| 8,304,733 B2 | 11/2012 | Alameh et al. | |
| 8,344,325 B2 | 1/2013 | Merrell et al. | |
| 8,384,694 B2 | 2/2013 | Powell et al. | |
| 2007/0296688 A1* | 12/2007 | Nakamura et al. | 345/102 |
| 2010/0165660 A1* | 7/2010 | Weber | G02B 5/305 362/609 |
| 2010/0295821 A1* | 11/2010 | Chang et al. | 345/175 |
| 2011/0037849 A1 | 2/2011 | Niclass et al. | |
| 2013/0016071 A1 | 1/2013 | Geaghan | |

FOREIGN PATENT DOCUMENTS

| | | |
|---|---|---|
| WO | WO-2004/102301 | 11/2004 |
| WO | 2012151417 A2 | 11/2012 |

* cited by examiner

*Primary Examiner* — Kenneth B Lee, Jr.
(74) *Attorney, Agent, or Firm* — McDermott Will & Emery LLP (57) ABSTRACT

Disclosed are a system and method for detecting a gesture performed by a user of a device. The device includes a screen having a backlight as with a liquid-crystal type display or which provides its own illumination as with a light-emitting diode type display. The device is programmed to emit a detectable optical signal from one or more distinct zones of the display. The device further includes an optical receiver for detecting any reflections of the emitted detectable optical signal. When a user's hand is located in proximity to the device display, the reflections of the detectable optical signal from that appendage are detected by the optical receiver and are used by the device to determine the presence and direction of travel of the user hand, signifying a user gesture. The distinct zones of the backlight may consist of a single zone, and the optical receiver may comprise multiple receivers.

19 Claims, 7 Drawing Sheets

GESTURE-SENSITIVE DISPLAY

CROSS-REFERENCE TO RELATED APPLICATIONS

The present application claims priority to U.S. Provisional Patent Application 61/843,620, filed on Jul. 8, 2013, which is herein incorporated by reference in its entirety for all that it teaches and discloses.

TECHNICAL FIELD

The present disclosure is related generally to computing device user interface techniques and, more particularly, to a system and method for sensing user gestures via a device display.

BACKGROUND

As mobile devices have diminished in size, new methods of user input have developed. For example, while user input was initially received exclusively via hardware such as buttons and sliders, users are now able to interface with many mobile devices via touch-screen inputs and spoken commands. Despite the general effectiveness of such input methods, an enhanced input technology could play a role in providing greater user convenience and allowing more advanced device capabilities.

The present disclosure is directed to a system that may provide enhanced user input capabilities without adding prohibitively to the device cost and size. However, it should be appreciated that any such benefits are not a limitation on the scope of the disclosed principles nor of the attached claims, except to the extent expressly noted in the claims. Additionally, the discussion of technology in this Background section is merely reflective of inventor observations or considerations and is not an indication that the discussed technology represents actual prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Although the disclosed principles will lend themselves to various different implementations, an example implementation of a device display system will be described in overview before proceeding to a detailed description. In the example embodiment, a zoned backlighting display system is provided and is controlled in such a way that each zone is illuminated by a separate group of light-emitting diodes ("LEDs") that are modulated. The zones may be modulated at the same or different frequencies and may be illuminated in a synchronized or non-synchronized manner depending on application needs. In a further embodiment, the illumination schedule is re-configurable.

The controlled zones are thus employed, in an embodiment, as distinct optical transmitters or channels, sending multiple distinct signals at essentially the same time. In this way, the multiple zones act as a multi-channel optical transmitter. An optical receiver distinct from the display is able to detect the reflected signal as a user's hand passes over the display, as when gesturing.

In another embodiment, useful for displays that use direct top emitting backlight LED arrays, multiple infrared ("IR") emitters are embedded within the backlighting LED arrays to form a multi-channel optical transmitter, and again, an optical receiver outside of the display is used to detect the reflected IR signal when an object traverses the display space. However, the use of a single receiver is not required. In an alternative embodiment, the display includes one centralized display zone to act as an optical transmitter and multiple optical receivers located around the display for gesture sensing.

Referring now to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Figure 1:
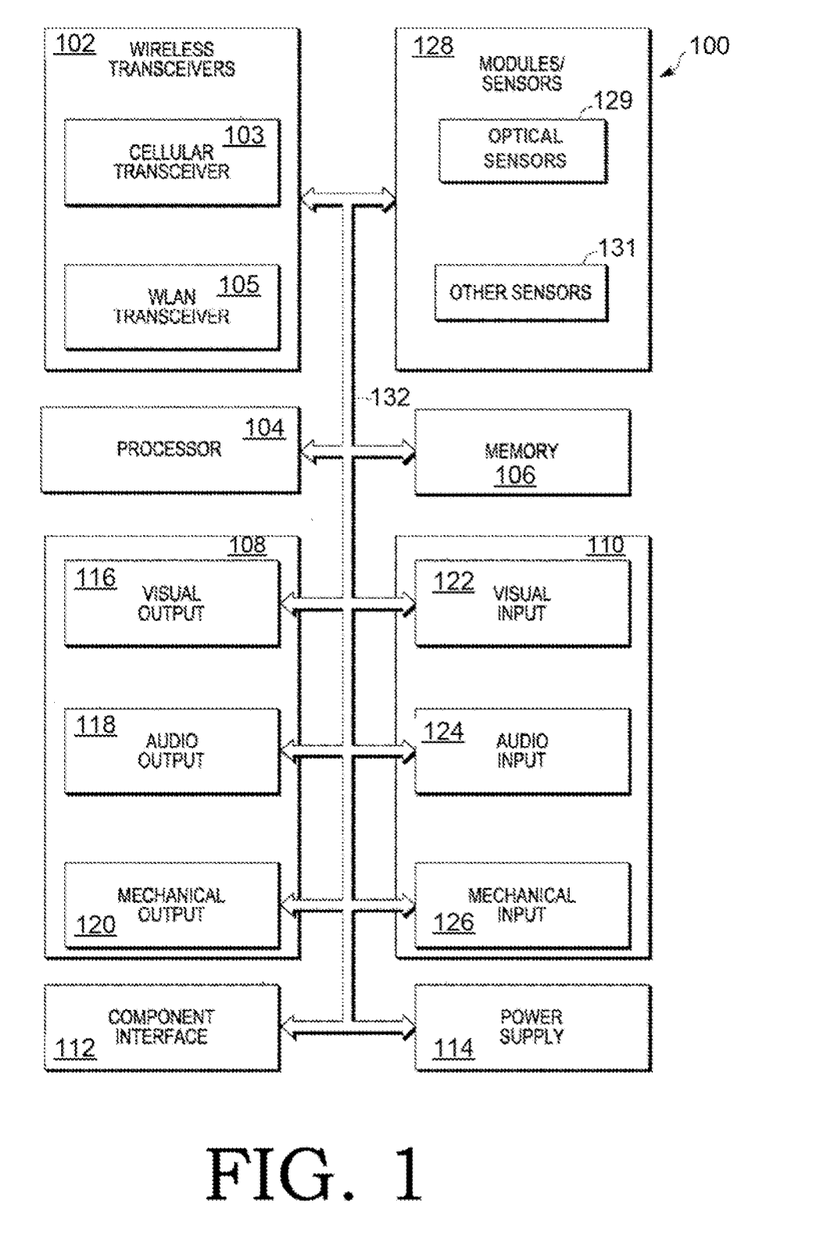
FIG. 1 is a generalized schematic of an example device within which the presently disclosed innovations may be implemented.

The schematic diagram of FIG. 1 shows an exemplary device within which aspects of the present disclosure may be implemented. In particular, the schematic diagram 100 illustrates exemplary internal components of a mobile smart phone implementation of a small touch-screen device. These components can include wireless transceivers 102, a processor 104, a memory 106, one or more output components 108, one or more input components 110, and one or more sensors 128, e.g., one or more optical sensors. The processor 104 may be any of a microprocessor, microcomputer, application-specific integrated circuit, or the like. Similarly, the memory 106 may, but need not, reside on the same integrated circuit as the processor 104.

The device can also include a component interface 112 to provide a direct connection to auxiliary components or accessories for additional or enhanced functionality and a power supply 114, such as a battery, for providing power to the device components. All or some of the internal components may be coupled to each other, and may be in communication with one another, by way of one or more internal communication links 132, such as an internal bus.

The memory 106 can encompass one or more memory devices of any of a variety of forms, such as read-only memory, random-access memory ("RAM"), static RAM, dynamic RAM, etc., and may be used by the processor 104 to store and retrieve data. The data that are stored by the memory 106 can include one or more operating systems or applications as well as informational data. The operating system and applications are implemented via computer-executable instructions stored in a nontransitory computer-readable medium in the device.

The device can be programmed such that the processor 104 and memory 106 interact with the other components of the device to perform a variety of functions, e.g., to interact with the display and optical receiver to generate signals indicative of gestures and to evaluate these signals to interpret gestures.

The output components 108 can include a variety of visual, audio, or mechanical outputs. For example, the output components 108 can include one or more visual-output components 116 such as a display screen. One or more audio-output components 118 can include a speaker, alarm, or buzzer, and one or more mechanical-output components 120 can include a vibrating mechanism, for example. Similarly, the input components 110 can include one or more visual-input components 122 such as an optical sensor of a camera, one or more audio-input components 124 such as a microphone, and one or more mechanical-input components 126 such as a touch-detecting surface and a keypad.

The sensors 128 primarily include the one or more optical sensors 129 used for gesture detection, but may also include other sensors 131, such as an accelerometer, a gyroscope, and so on. As noted above, the device 100 provides an effective and economical gesture-sensing ability through the use of a zoned display and one or more optical receivers. The simplified plan view shown in FIG. 2 represents an example device screen zone and sensor arrangement wherein an embodiment of the disclosed principles may be implemented.

Figure 2:
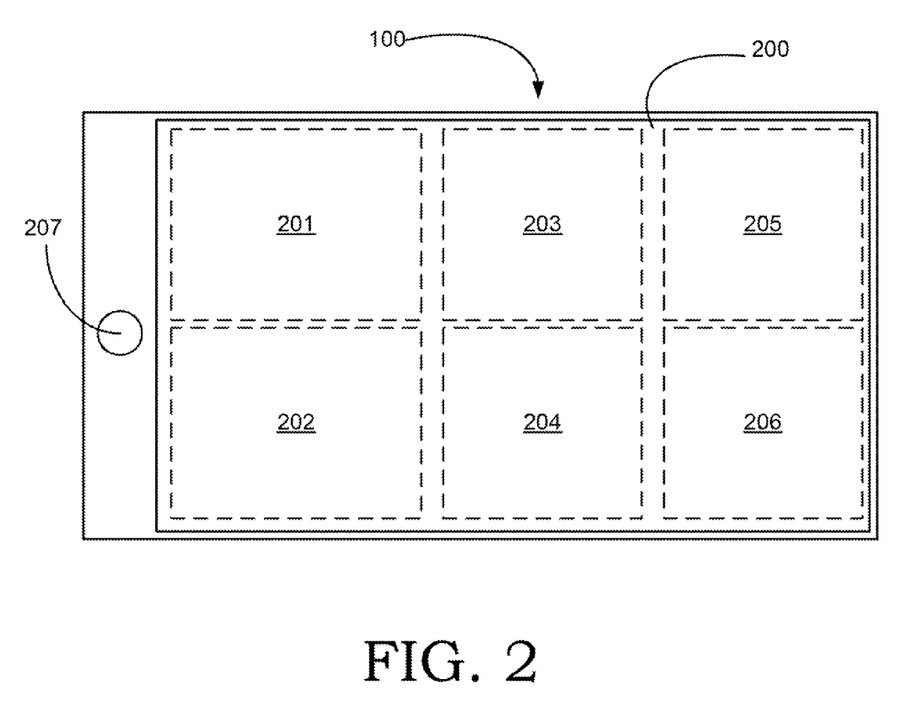
FIG. 2 is a simplified plan view of a representative environment in which the presently disclosed techniques may be practiced.

The device display 200 shown in FIG. 2 is divided into multiple segments or zones, each of which is independently controllable to emit an optical signal, but all of which are coordinated to perform the normal display function for the device. In the embodiment shown, the display 200 is divided into six zones, including a first zone 201, a second zone 202, a third zone 203, a fourth zone 204, a fifth zone 205, and a sixth zone 206. In addition to the zones 201, 202, 203, 204, 205, 206 of the display 200, the device 100 also includes an optical receiver 207 for detecting reflected light, e.g., from a hand or finger in front of the display 200.

Figure 3:
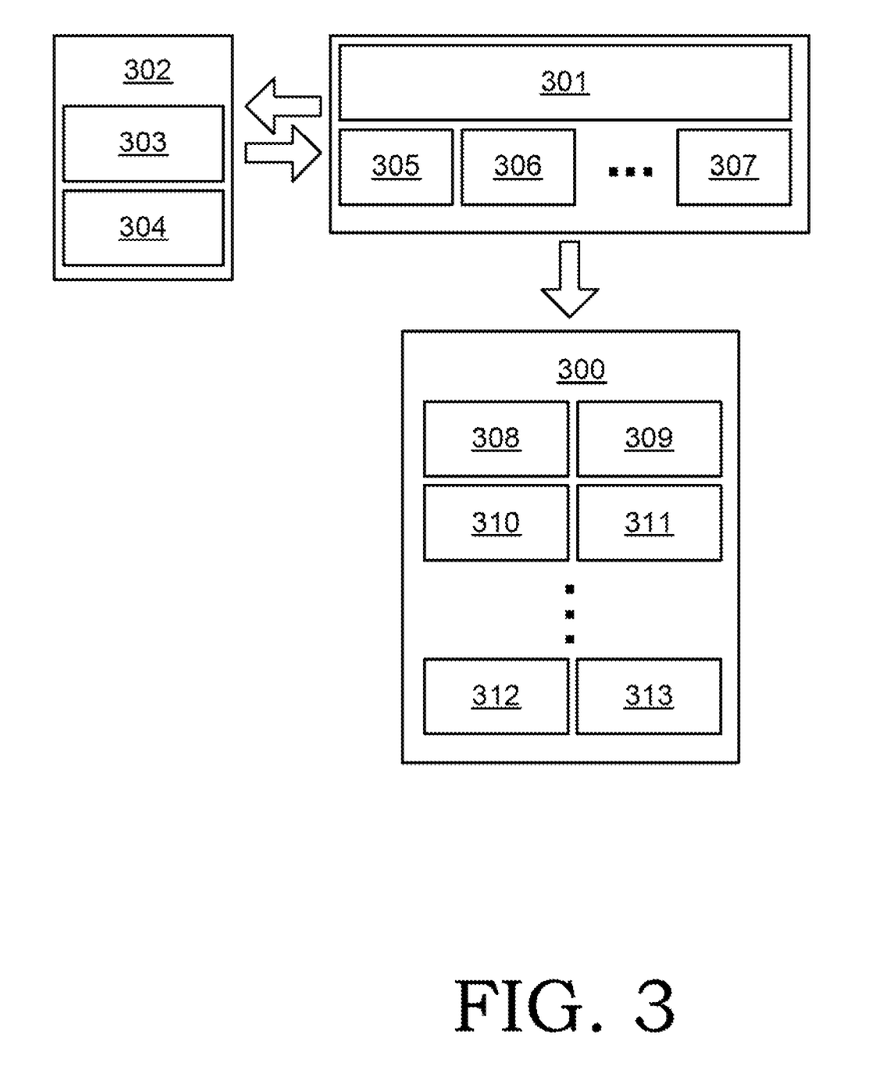
FIG. 3 is an architectural schematic of a control system for implementing embodiments of the disclosed principles.

For controlling a display configuration and sensor system as shown in FIG. 2, a display controller may be used, as shown schematically in FIG. 3. In particular, FIG. 3 shows the use of a display controller 300 in conjunction with a processor 301. The processor 301 implements signal generation functions 302, including a modulation generator 303 and a frequency generator 304. The modulation generator 303 and the frequency generator 304 generate signal characteristics for each display zone.

The processor 301 stores the signal characteristics for the different display zones in respective RAM locations associated with the processor 301, e.g., RAM1 (305), RAM2 (306), and so on, up to RAMn (307), where n represents the number of display zones implemented.

The processor 301 then drives the display controller 300 with the stored values to provide an encoded optical output. In particular, the display controller 300 provides an input signal and backlight control signal for each zone of the display. Thus, for a display with n zones, the display controller 300 provides a first input 308 and a first backlight control signal 309, a second input 310 and a second backlight control signal 311, and so on, up to an nth input 312 and an nth backlight control signal 313. In this way, the processor 301 is able to cause a desired spatial encoding of the backlight optical output to allow for subsequent gesture detection based on reflection.

While the example of FIG. 3 can function with a practically unlimited number of display zones, the resolution of the movement detection provided by the system does not require a large number of zones. In particular, the resolution is not limited to the spatial resolution of the zones, i.e., the system is not limited to simply detecting that an object is or is not above a particular zone. Rather, the reflected optical signals are detected by the optical sensor and converted to a differential signal. Thus, while a single zone may not provide any ability to resolve object location (i.e., very little data can be generated beyond the object's presence, absence, or distance), a device having three zones may identify object location via differential signal detection. While a device having four zones may improve the resolution and reliability of the system further, it will be appreciated that the resolution of the system is also impacted by the size of each zone.

Figure 4:
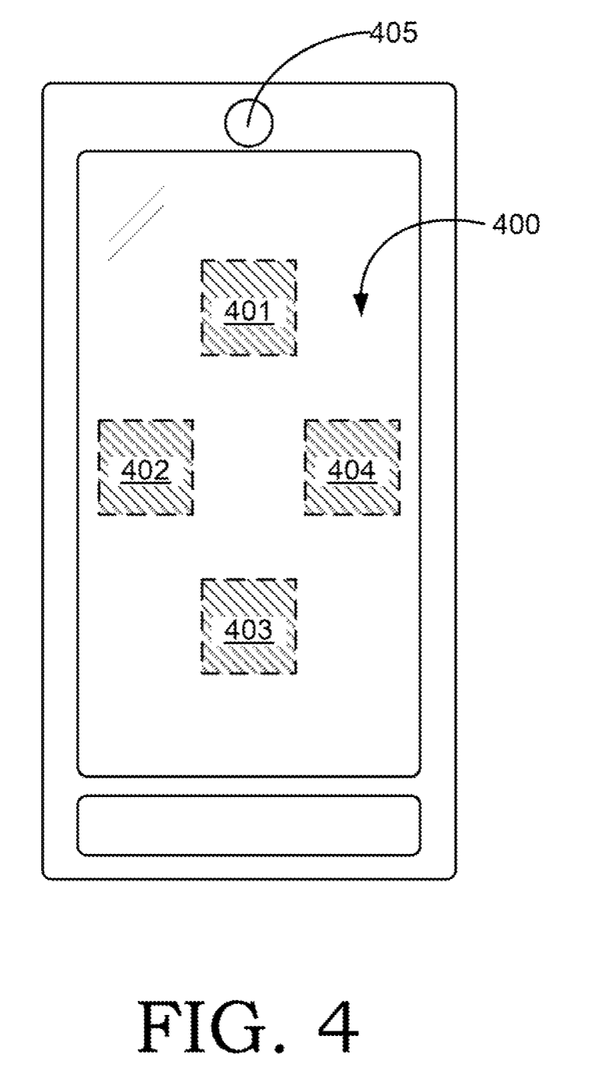
FIG. 4 is a schematic view of a transmitter and sensor arrangement in accordance with an embodiment of the disclosed principles.

The plan view diagram of FIG. 4 shows an exemplary device display 400 having an arrangement of multiple display zones under the control of a display encoder for encoding the backlight output of each zone. Since the backlighting of each of the first zone 401, second zone 402, third zone 403, and fourth zone 404 is encoded differently from that of each other zone, each reflection can be effectively traced to the source zone. For detecting reflected light, an optical receiver 405 is located on the device outside of the display area 400.

Although the embodiment of FIG. 4 employs the backlight capabilities of multiple display zones, it is also possible to embed a controllable optical element within each zone to perform the encoded emission for that zone. For example, with respect to displays that use direct top emitting backlight LED arrays, multiple IR emitters can be embedded within the backlight LED arrays as a collective multi-channel optical transmitter.

Figure 5:
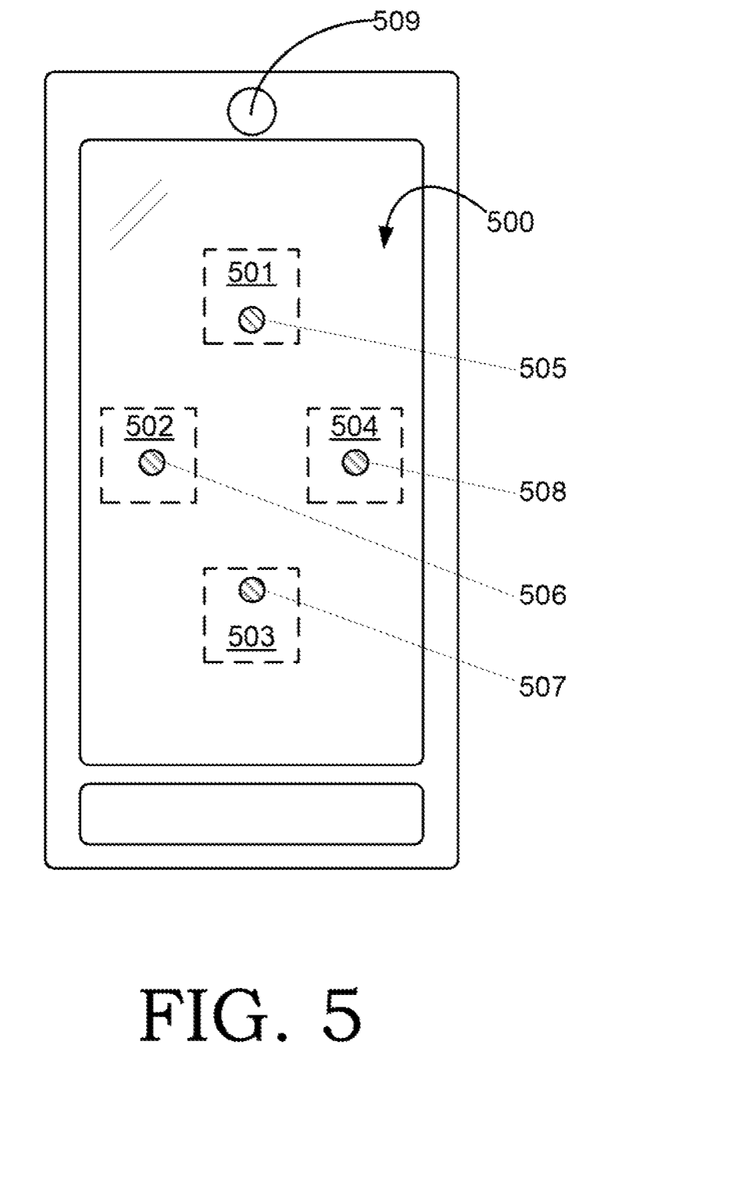
FIG. 5 is a schematic view of an alternative transmitter and sensor arrangement in accordance with a further embodiment of the disclosed principles.

FIG. 5 illustrates such an arrangement. In the example shown in FIG. 5, the device display 500 includes a first zone 501, a second zone 502, a third zone 503, and a fourth zone 504. Within the backlight LEDs of each zone, there is an IR emitter. Thus, an IR emitter 505, 506, 507, 508 is located within each zone 501, 502, 503, 504, respectively. As with the foregoing embodiment, an optical receiver 509 is located outside of the display 500 to detect the reflected IR signal.

In an embodiment, the liquid-crystal display being backlit is IR transparent. It will be appreciated that a greater or lesser number of IR LEDs may be used, and that the location of each IR LED in a given implementation may depend upon display geometry and signal optimization, e.g., which arrangement provides the best differential signal in a given implementation.

Although utilizing existing display elements with a single optical receiver minimizes the hardware changes required to implement the disclosed system on existing devices, it will be appreciated that this benefit is not required in every embodiment. For example, it is possible to use few or even a single display zone as an optical transmitter while employing multiple optical receivers to enable differential detection.

Figure 6:
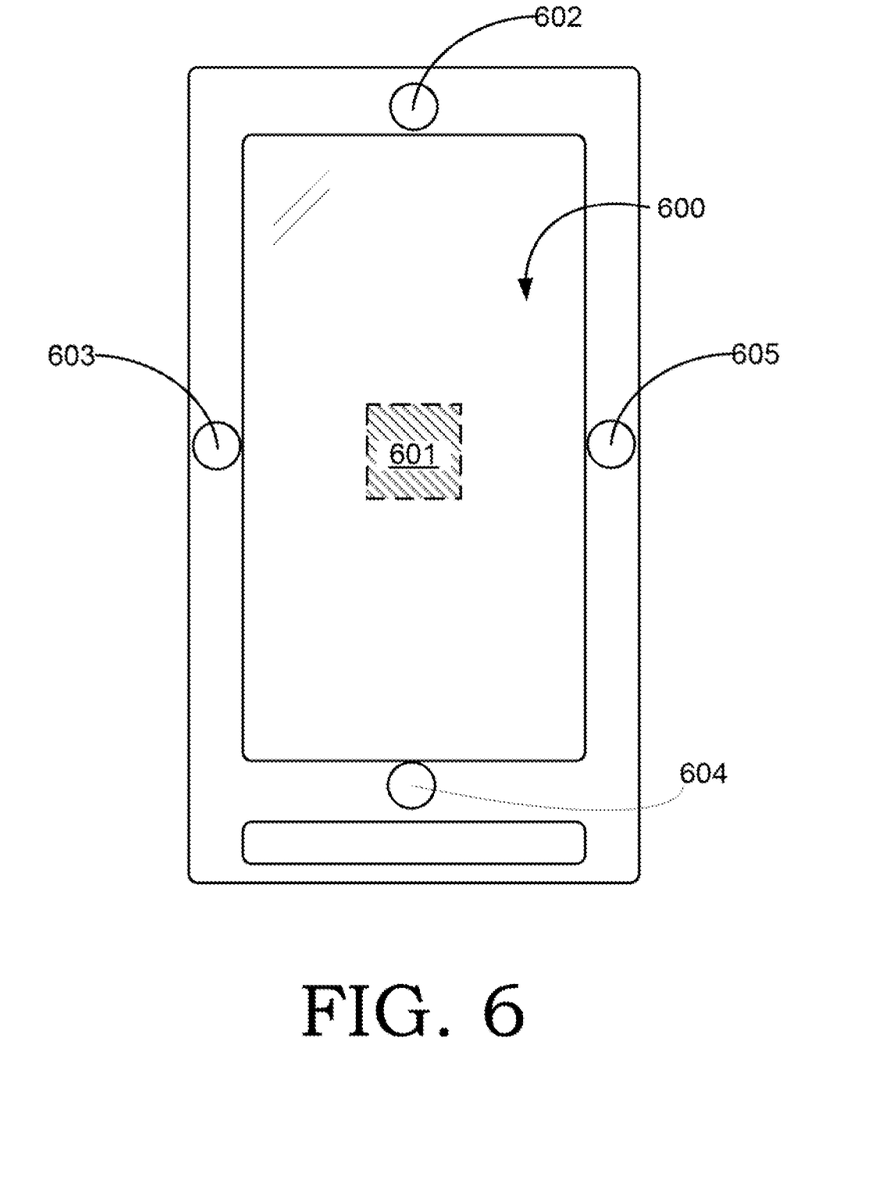
FIG. 6 is a schematic view of another alternative transmitter and sensor arrangement in accordance with yet another embodiment of the disclosed principles.

In the example shown in FIG. 6, the device display 600 includes a single controlled backlight zone 601, centrally located in the screen, for emitting a distinctive frequency or temporal pattern of light (that is, discernible from the light emitted from other areas of the display 600). A plurality of optical receivers are located around the display 600 to receive any reflections of the light emitted by the single controlled backlight zone 601. In the illustrated example, the device includes a first optical receiver 602 above the display 600, a second optical receiver 603 to the left of the display 600, a third optical receiver 604 below the display 600, and a fourth optical receiver 605 to the right of the display 600.

In this example, rather than employing a multi-channel optical transmitter formed of a plurality of individual emission zones, the device employs a multi-channel optical receiver formed of a plurality of individual optical receivers. The signals received from the various optical receivers may be combined to yield a differential signal, which identifies the current location of the object, e.g., a hand, in front of the display.

As will be appreciated from the foregoing examples, the described system provides many benefits when applied to handheld devices such as mobile communications devices. However, the disclosed principles are also applicable to other machine forms, such as laptop computers, desktop computers, and even televisions, e.g., those with direct top emitting LED arrays. In addition, the type of input receivable is essentially unlimited. For example, gesture detection may be used to facilitate application input, game play, interaction with an operating system to select an application or game, and so on.

Figure 7:
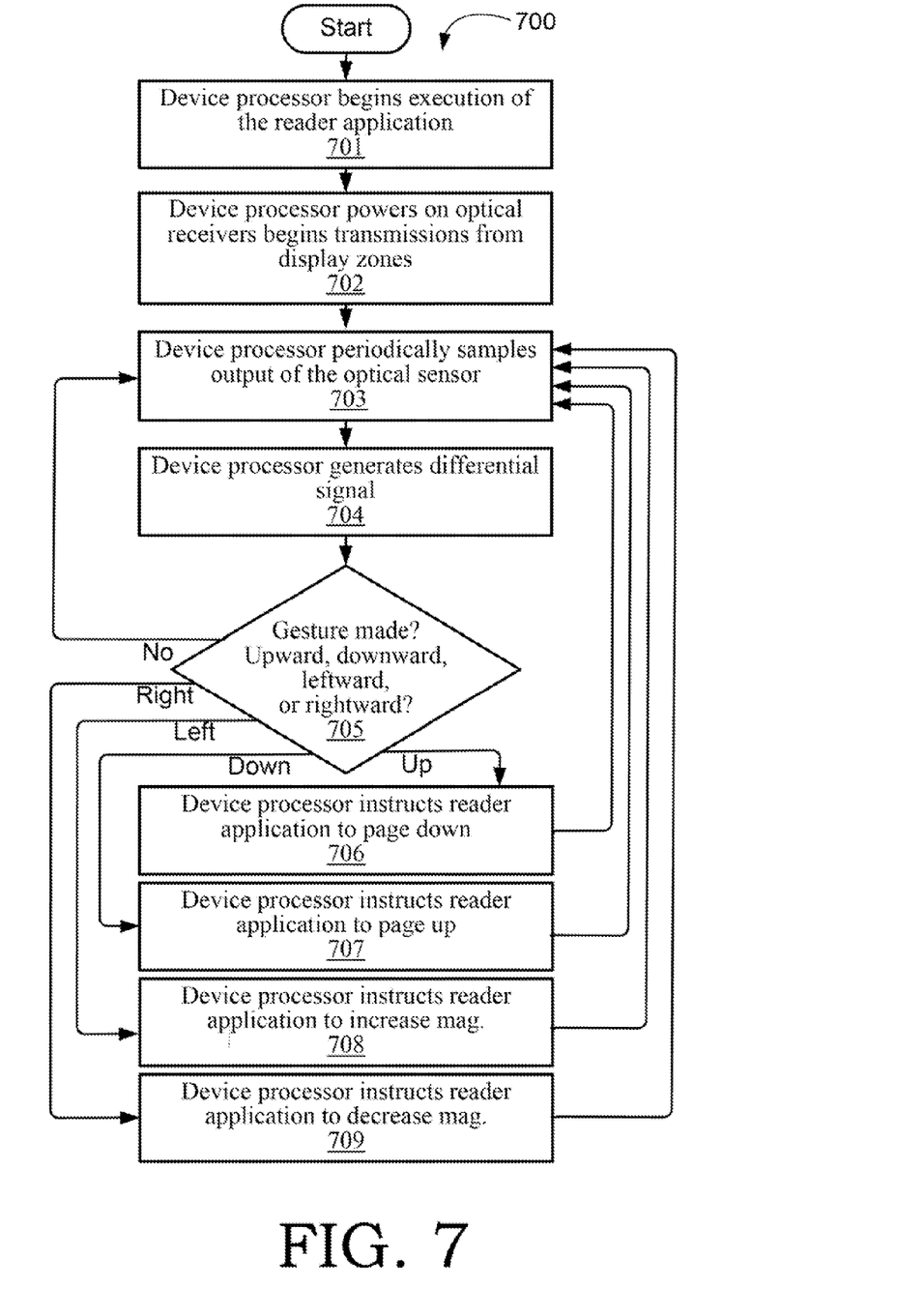
FIG. 7 is a flowchart of a representative method for detecting and interpreting user gestures to navigate within a reader application in accordance with the disclosed principles.

The manner of operation of a device implemented in accordance with the disclosed principles may vary depending upon the exact configuration chosen as well as the application within which the system is used, e.g., for game play, for data manipulation, for program selection, etc. Nonetheless, the flowchart of FIG. 7 shows an example of operational flow in a typical application.

The application exemplified is a reader application wherein an upward gesture indicates a user desire to "move" the page up, i.e., to read further down, and a downward gesture indicates a user desire to "move" the page further down, i.e., to read further up. Horizontal gestures indicate a magnification selection. In particular, a leftward gesture indicates a user desire to increase magnification while a rightward gesture indicates a user desire to decrease magnification. The entities employed to sense, interpret, and act upon user gestures are described according to the architecture described above in relation to FIGS. 1 and 3. However, other implementations will be appreciated by those of skill in the art.

At stage 701 of the process 700, the device processor begins execution of the reader application. Subsequently at stage 702, the device processor powers on the optical receiver(s) (FIG. 4) and begins modulated transmissions from the backlights of the plurality of display zones (FIGS. 2, 4, and 5) via the display controller.

The processor periodically samples the output of the optical sensor(s) at stage 703 and generates a differential signal at stage 704. Based on the generated differential signal, the processor determines at stage 705 if a gesture has been made and, if so, whether the gesture was upward, downward, leftward, or rightward.

If no gesture is detected, then the process 700 returns to stage 703, whereas if an upward gesture has been detected, then the process flows to stage 706. At stage 706, the processor instructs the reader application to page down. If at stage 705 a downward gesture has been detected, then the process 700 flows to stage 707 wherein the processor instructs the reader application to page up.

Similarly, if at stage 705 a leftward gesture has been detected, then the process 700 flows to stage 708 wherein the processor instructs the reader application to increase display magnification. Finally, if at stage 705 a rightward gesture has been detected, then the process 700 flows to stage 709 wherein the processor instructs the reader application to decrease display magnification. After execution of any of stages 706, 707, 708, 709, the process 700 returns to stage 703.

In this way, the user is able to navigate within the reader application with simple hand gestures. Similarly, the described gesture detection architecture and methodology may be used to allow the user to interact with other applications, with device features, and so on. For example, a user may use a gesture to navigate icon screens presented by the operating system, or to answer a call, initiate a text, and so on. The described gesture detection may also operate in conjunction with other input modalities, such as a voice or speech detection or recognition, device movement, button presses, and so on.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A system for detecting a gesture performed by a user of a device, the system comprising:
   a display associated with the device and having an active area, the display having a backlight for backlighting the active area, the backlight being formed of addressable elements;
   at least one optical receiver located on the device adjacent the display in a position to capture a reflection of light emitted by the backlight; and
   a processor associated with the device, the processor being configured to address a plurality of distinct zones of the backlight such that each such zone emits an identifiable light pattern, to receive a sensed signal from the at least one optical receiver associated with a reflection of light emitted from the one or more distinct zones, and to identify a user gesture based on the reflection.

2. The system of claim 1 wherein the processor is further configured to address the distinct zones of the backlight such that each such zone emits an identifiable light pattern in a visible spectrum.

3. The system of claim 1 wherein the processor is further configured to address the distinct zones of the backlight such that each such zone emits an identifiable light pattern in an infrared spectrum.

4. The system of claim 1 wherein the distinct zones consist of a single zone.

5. The system of claim 1 wherein the distinct zones include multiple zones.

6. The system of claim 1 wherein the processor is further configured to allow reconfiguration of characteristics, location, or number of the distinct zones.

7. The system of claim 1 wherein the at least one optical receiver consists of a single optical receiver.

8. The system of claim 1 wherein the processor is further configured to identify a user gesture based on the reflection by creating a differential signal based on the sensed signal.

9. A method for detecting a gesture performed at a display of a device, the display having an active area for displaying information and a plurality of light-emitting elements associated with the active area, the method comprising:

emitting from at least a subset of the plurality of light-emitting elements a backlighting for the display, the backlighting being divided into a plurality of distinct zones, the divided backlighting of each respective zone being encoded with a distinct signal for the respective zone that is different than the signals of each other zone;

detecting a reflection of the emitted backlighting at an optical receiver on the device and adjacent to the display, the reflection including one of the distinct signals for a zone corresponding to the reflection; and based on the detected reflection, identifying the gesture performed at the display.

10. The method of claim 9 further comprising:
emitting the backlighting from only a portion of the active area.

11. The method of claim 9 wherein emitting the backlighting comprises emitting an identifiable light pattern in a visible spectrum.

12. The method of claim 9 wherein emitting the backlighting comprises emitting an identifiable light pattern in an infrared spectrum.

13. The method of claim 9 wherein detecting a reflection of the emitted backlighting at an optical receiver on the device comprises detecting the reflection at multiple optical receivers.

14. The method of claim 9 wherein identifying the gesture comprises creating a differential signal based on the detected reflection.

15. The method of claim 9 wherein the device is a portable electronic device.

16. The method of claim 9 wherein the device is a desktop electronic device.

17. A method of detecting a gesture by a user of a portable electronic device, the method comprising:

emitting a backlighting for an active area of a display of the portable electronic device, the backlighting being divided into a plurality of distinct zones, the divided backlighting of each respective zone being encoded with a distinct signal for the respective zone that is different than the signals of each other zone;

detecting a series of reflections of the backlighting at one or more photosensors on the portable electronic device, the one or more photosensors being positioned adjacent to the display; and based on the detected series of reflections, determining a presence and direction of travel of a touch point on the display.

18. The method of claim 17 wherein emitting the backlighting comprises emitting multiple distinct portions of the backlighting.

19. The method of claim 18 wherein the display is a light-emitting diode ("LED") display and wherein the backlighting is emitted from multiple separated groups of adjacent LEDs.

* * * * *